United States Patent
Kung et al.

(10) Patent No.: US 11,205,045 B2
(45) Date of Patent: Dec. 21, 2021

(54) CONTEXT-BASED AUTOCOMPLETION SUGGESTION

(71) Applicant: INTERNATIONAL BUSINESS MACHINES CORPORATION, Armonk, NY (US)

(72) Inventors: Norman Kung, Taipei (TW); Chih-Hsiung Liu, Taipei (TW); Cheng-Lun Yang, Taipei (TW); Joanne Kuei-Chen Ho, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

(21) Appl. No.: 16/028,752

(22) Filed: Jul. 6, 2018

(65) Prior Publication Data

US 2020/0012718 A1 Jan. 9, 2020

(51) Int. Cl.
*G06F 40/274* (2020.01)
*G06F 40/242* (2020.01)
*H04L 12/58* (2006.01)

(52) U.S. Cl.
CPC ............ *G06F 40/274* (2020.01); *H04L 51/04* (2013.01); *G06F 40/242* (2020.01)

(58) Field of Classification Search
CPC ..... G06F 17/276; G06F 40/242; G06F 40/274
See application file for complete search history.

(56) References Cited

U.S. PATENT DOCUMENTS

| 6,763,383 B1 * | 7/2004 | Evison | G06F 11/3495 707/999.202 |
| 6,839,680 B1 * | 1/2005 | Liu | G06Q 30/0204 705/7.33 |

(Continued)

FOREIGN PATENT DOCUMENTS

| CN | 103399906 A | * | 11/2013 | ............. G06Q 50/01 |
| CN | 103399906 B | * | 7/2015 | ............. G06Q 10/10 |
| WO | WO-2015014159 A1 | * | 2/2015 | ........... G06F 40/253 |

OTHER PUBLICATIONS

Tseng, Bo-Hsiang et al. "Personalizing Universal Recurrent Neural Network Language Model with user Characteristic Features by Social Network Crowdsourcing", Feb. 11, 2016, IEEE, <https://ieeexplore.ieee.org/document/7404778> (Year: 2016).*

(Continued)

*Primary Examiner* — Kavita Stanley
*Assistant Examiner* — Tyler Schallhorn
(74) *Attorney, Agent, or Firm* — Scott Dobson; Matthew M. Hulihan; Heslin Rothenberg Farley & Mesiti PC

(57) ABSTRACT

A process for context-based autocompletion suggestion includes, based on initiating an online chat by a user of a computer system, the chat having as participants the user and a target participant, providing participant information that identifies the participants. The process maintains at the computer system a relation-based autocompletion model for use in word autocompletion suggesting. The maintained relation-based autocompletion model is initially a template model based on to relationship between chat participants, and is updated over time via training. The process suggests to the user words for autocompletion in the user's composition of chat messages, the suggested words being selected as suggestions based on the maintained relation-based autocompletion model. Maintaining the relation-based auto- (Continued)

completion model includes sending chat messages as training data to further train the autocompletion model.

20 Claims, 11 Drawing Sheets

(56) References Cited

U.S. PATENT DOCUMENTS

| | | | | |
|---|---|---|---|---|
| 7,797,269 | B2* | 9/2010 | Rieman | G06F 3/0237 706/62 |
| 7,827,165 | B2* | 11/2010 | Abernethy, Jr. | G06F 40/242 707/708 |
| 7,912,700 | B2 | 3/2011 | Bower et al. | |
| 8,010,615 | B2* | 8/2011 | Jimenez | G06Q 10/107 709/206 |
| 8,903,719 | B1* | 12/2014 | Landry | H04L 51/063 704/10 |
| 9,035,884 | B2* | 5/2015 | Phillips | G06F 16/273 345/168 |
| 9,141,689 | B2* | 9/2015 | Chen | G06F 40/279 |
| 9,195,645 | B2* | 11/2015 | Grieves | G06F 3/0237 |
| 9,208,201 | B2* | 12/2015 | Giampaolo | G06F 16/2471 |
| 9,235,565 | B2* | 1/2016 | Tseng | G06F 40/232 |
| 9,244,905 | B2* | 1/2016 | Joshi | G06F 3/0237 |
| 9,262,397 | B2* | 2/2016 | Gamon | G06F 17/274 |
| 9,280,534 | B2* | 3/2016 | Hauser | G06F 17/273 |
| 9,330,082 | B2* | 5/2016 | Tseng | G06F 40/232 |
| 9,330,083 | B2* | 5/2016 | Tseng | G06F 40/40 |
| 9,348,808 | B2* | 5/2016 | Kurabayashi | G06F 40/263 |
| 9,361,292 | B2* | 6/2016 | Phillips | G06F 40/263 |
| 9,424,246 | B2* | 8/2016 | Spencer | G06F 17/276 |
| 9,613,022 | B2* | 4/2017 | Stewart | G06F 17/273 |
| 9,626,152 | B2* | 4/2017 | Kim | G06F 40/274 |
| 9,672,818 | B2* | 6/2017 | Bradford | G10L 15/18 |
| 9,740,677 | B2* | 8/2017 | Kim | G06F 40/20 |
| 9,747,895 | B1* | 8/2017 | Jansche | G10L 15/183 |
| 9,760,559 | B2* | 9/2017 | Dolfing | G06F 40/274 |
| 9,805,371 | B1* | 10/2017 | Sapoznik | G06F 16/245 |
| 9,807,037 | B1* | 10/2017 | Sapoznik | H04M 3/5141 |
| 9,842,101 | B2* | 12/2017 | Wang | G06F 16/3322 |
| 9,864,742 | B2* | 1/2018 | Chen | G06F 40/253 |
| 9,904,673 | B2* | 2/2018 | Janakiraman | H04L 51/063 |
| 9,949,103 | B2* | 4/2018 | Barsness | H04W 4/025 |
| 9,977,774 | B2* | 5/2018 | Tseng | G06F 40/274 |
| 10,042,841 | B2* | 8/2018 | Bute | H04W 8/205 |
| 10,055,397 | B2* | 8/2018 | Bell | G06F 17/27 |
| 10,140,283 | B2* | 11/2018 | Griffin | G06F 40/242 |
| 10,168,800 | B2* | 1/2019 | Kim | G10L 15/183 |
| 10,229,167 | B2* | 3/2019 | Lindsay | G06F 16/335 |
| 10,372,818 | B2* | 8/2019 | Bute | G06F 40/242 |
| 10,423,240 | B2* | 9/2019 | Ryu | G06F 3/018 |
| 10,613,825 | B2* | 4/2020 | Moorjani | G06F 40/274 |
| 10,921,903 | B2* | 2/2021 | Ryu | G06F 3/04886 |
| 2002/0065657 | A1* | 5/2002 | Reding | G10L 15/30 704/246 |
| 2004/0204124 | A1* | 10/2004 | Campbell | H04M 1/7253 455/566 |
| 2008/0052272 | A1* | 2/2008 | Altaf | G06F 17/273 |
| 2008/0243736 | A1* | 10/2008 | Rieman | G06F 3/0237 706/18 |
| 2008/0243737 | A1* | 10/2008 | Rieman | G06F 15/16 706/18 |
| 2008/0243738 | A1* | 10/2008 | Rieman | G06F 15/16 706/18 |
| 2009/0077130 | A1* | 3/2009 | Abernethy, Jr. | G06F 40/242 |
| 2009/0254817 | A1* | 10/2009 | Dreyfus | G06F 17/273 715/257 |
| 2009/0313274 | A1* | 12/2009 | Chen | H04L 67/306 |
| 2010/0114887 | A1* | 5/2010 | Conway | G06F 16/374 707/737 |
| 2010/0169769 | A1* | 7/2010 | Jimenez | G06Q 10/107 715/259 |
| 2012/0089387 | A1* | 4/2012 | Gamon | G06F 17/274 704/9 |
| 2012/0101811 | A1* | 4/2012 | Griffin | G06F 40/242 704/10 |
| 2012/0310880 | A1* | 12/2012 | Giampaolo | G06F 16/2471 707/610 |
| 2013/0151508 | A1* | 6/2013 | Kurabayashi | G06F 16/90328 707/723 |
| 2013/0158987 | A1* | 6/2013 | Xing | G06F 40/274 704/10 |
| 2013/0211824 | A1* | 8/2013 | Tseng | G06F 17/273 704/10 |
| 2014/0032206 | A1* | 1/2014 | Grieves | G06F 17/276 704/9 |
| 2014/0108018 | A1* | 4/2014 | Phillips | G06F 17/275 704/275 |
| 2014/0136970 | A1* | 5/2014 | Xiao | G06F 17/24 715/271 |
| 2014/0143665 | A1* | 5/2014 | Hauser | G06F 17/273 715/259 |
| 2014/0163954 | A1* | 6/2014 | Joshi | G06F 3/0237 704/9 |
| 2014/0244621 | A1* | 8/2014 | Lindsay | G06F 16/335 707/722 |
| 2014/0278349 | A1* | 9/2014 | Grieves | G06F 40/242 704/8 |
| 2014/0297267 | A1* | 10/2014 | Spencer | G06F 17/276 704/9 |
| 2014/0316784 | A1* | 10/2014 | Bradford | G10L 15/18 704/245 |
| 2015/0134326 | A1* | 5/2015 | Bell | G06F 17/276 704/9 |
| 2015/0149896 | A1* | 5/2015 | Radhakrishnan | G06F 17/2735 715/271 |
| 2015/0331878 | A1 | 11/2015 | Joseph et al. | |
| 2015/0347382 | A1* | 12/2015 | Dolfing | G06F 40/284 704/9 |
| 2015/0347391 | A1* | 12/2015 | Chen | H04L 51/046 704/9 |
| 2015/0370780 | A1* | 12/2015 | Wang | G06F 16/3322 704/9 |
| 2016/0182410 | A1* | 6/2016 | Janakiraman | G06F 17/2785 709/206 |
| 2016/0197765 | A1* | 7/2016 | Brown | H04L 41/069 709/217 |
| 2016/0210116 | A1* | 7/2016 | Kim | G06F 3/167 |
| 2016/0210280 | A1 | 7/2016 | Tseng et al. | |
| 2016/0210962 | A1* | 7/2016 | Kim | G06F 40/274 |
| 2016/0224524 | A1* | 8/2016 | Kay | G06F 3/0236 |
| 2016/0224540 | A1 | 8/2016 | Stewart et al. | |
| 2016/0224687 | A1* | 8/2016 | Kurabayashi | G06F 17/2223 |
| 2016/0252972 | A1* | 9/2016 | Kim | G10L 15/183 704/9 |
| 2016/0359771 | A1* | 12/2016 | Sridhar | H04L 51/02 |
| 2017/0017637 | A1* | 1/2017 | Bute | H04L 67/306 |
| 2017/0017639 | A1* | 1/2017 | Bute | G06F 40/242 |
| 2017/0154030 | A1* | 6/2017 | Moorjani | G06F 3/167 |
| 2017/0180276 | A1* | 6/2017 | Gershony | H04L 51/02 |
| 2017/0249017 | A1* | 8/2017 | Ryu | G06F 3/0237 |
| 2017/0365253 | A1* | 12/2017 | Bradford | G10L 15/18 |
| 2018/0049009 | A1* | 2/2018 | Barsness | H04W 4/025 |
| 2019/0034483 | A1* | 1/2019 | Millius | G06F 16/387 |
| 2019/0197101 | A1* | 6/2019 | Lambert | G06N 20/00 |
| 2019/0377425 | A1* | 12/2019 | Ryu | G06F 40/274 |

OTHER PUBLICATIONS

Mell, Peter, et al., "The NIST Definition of Cloud Computing", NIST Special Publication 800-145, Sep. 2011, Gaithersburg, MD, 7 pgs.

* cited by examiner

CONTEXT-BASED AUTOCOMPLETION SUGGESTION

BACKGROUND

Mobile devices commonly include word autocompletion technology for inputting text to a computer system, especially when participating in online chats. As the user types a word, the system predicts what word the user is entering and offers suggestions. If the predictions are accurate, the user can usually more quickly select the proper predicted word faster than it would take for the user to finish typing the word. Thus, mobile operating systems utilize autocomplete to reduce the amount of typing required of the users interacting with their mobile devices, to provide a better user experience. Autocomplete algorithms may be able to adapt to different users' vocabulary based on past word selection and message content, but lack more robust features.

SUMMARY

Shortcomings of the prior art are overcome and additional advantages are provided through the provision of a computer-implemented method. The method includes, based on initiation of an online chat by a user of a computer system, the online chat having participants that include the user and a target participant to which messages sent by the user as part of the online chat are targeted, providing to a remote facility participant information of the participants of the online chat that identifies the participants of the online chat. The method maintains at the computer system a relation-based autocompletion model for use in word autocompletion suggesting. The maintained relation-based autocompletion model is initially a relation-based template autocompletion model received by the computer system from the remote facility based on providing the participant information, and is updated over time by training the relation-based autocompletion model. The method suggests, based on user input to compose messages for sending as part of the online chat, to the user words for autocompletion in the user's composition of the messages. The suggested words are selected as suggestions based, at least in part, on the maintained relation-based autocompletion model. Maintaining the relation-based autocompletion model includes locally saving, on the computer system in a message history, sent messages composed and sent by the user as part of the online chat. The maintaining also includes sending the locally saved, sent messages of the message history to the remote facility for use in training the relation-based autocompletion model. The maintaining also includes receiving, from the remote facility, based on the training, a trained, updated relation-based autocompletion model. Additionally, the maintaining includes storing the received, trained, updated relation-based autocompletion model on the client as the maintained relation-based autocompletion model for use in the suggesting.

Further, a computer system is provided that includes a memory and a processor in communication with the memory, wherein the computer system is configured to perform a method. The method includes, based on initiation of an online chat by a user of a computer system, the online chat having participants that include the user and a target participant to which messages sent by the user as part of the online chat are targeted, providing to a remote facility participant information of the participants of the online chat that identifies the participants of the online chat. The method maintains at the computer system a relation-based autocompletion model for use in word autocompletion suggesting. The maintained relation-based autocompletion model is initially a relation-based template autocompletion model received by the computer system from the remote facility based on providing the participant information, and is updated over time by training the relation-based autocompletion model. The method suggests, based on user input to compose messages for sending as part of the online chat, to the user words for autocompletion in the user's composition of the messages. The suggested words are selected as suggestions based, at least in part, on the maintained relation-based autocompletion model. Maintaining the relation-based autocompletion model includes locally saving, on the computer system in a message history, sent messages composed and sent by the user as part of the online chat. The maintaining also includes sending the locally saved, sent messages of the message history to the remote facility for use in training the relation-based autocompletion model. The maintaining also includes receiving, from the remote facility, based on the training, a trained, updated relation-based autocompletion model. Additionally, the maintaining includes storing the received, trained, updated relation-based autocompletion model on the client as the maintained relation-based autocompletion model for use in the suggesting.

Yet further, a computer program product including a computer readable storage medium readable by a processing circuit and storing instructions for execution by the processing circuit is provided for performing a method. The method includes, based on initiation of an online chat by a user of a computer system, the online chat having participants that include the user and a target participant to which messages sent by the user as part of the online chat are targeted, providing to a remote facility participant information of the participants of the online chat that identifies the participants of the online chat. The method maintains at the computer system a relation-based autocompletion model for use in word autocompletion suggesting. The maintained relation-based autocompletion model is initially a relation-based template autocompletion model received by the computer system from the remote facility based on providing the participant information, and is updated over time by training the relation-based autocompletion model. The method suggests, based on user input to compose messages for sending as part of the online chat, to the user words for autocompletion in the user's composition of the messages. The suggested words are selected as suggestions based, at least in part, on the maintained relation-based autocompletion model. Maintaining the relation-based autocompletion model includes locally saving, on the computer system in a message history, sent messages composed and sent by the user as part of the online chat. The maintaining also includes sending the locally saved, sent messages of the message history to the remote facility for use in training the relation-based autocompletion model. The maintaining also includes receiving, from the remote facility, based on the training, a trained, updated relation-based autocompletion model. Additionally, the maintaining includes storing the received, trained, updated relation-based autocompletion model on the client as the maintained relation-based autocompletion model for use in the suggesting.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Online chats include instant messages, text messages, group messages, chatrooms, unified messaging, and other electronic messaging and communications facilities. Many other forms of online chats exist. Some examples provided herein are presented using text messaging as the online chat facility. However, this is only by way of example; it is immediately apparent that aspects described herein apply to other forms of online chat, and more generally to any user-input of words to a computer system.

Online chat behavior differs among users and based on various contexts of the online chat, such as the other participants who receive the messages composed and sent by a user. For example, it may be inappropriate to converse with a coworker using particular words, phrases, tone, and so on as if he or she was personal friend. Thus, for the autocomplete facility of a user's device to suggest that the user use a particular taboo word when replying to a colleague via business email or text, even though that user may frequently use such word with his close friends, may be inappropriate.

Described herein are aspects that can provide suggestions of words and/or phrases based on a user's personal texting habits and vocabulary as well as past texting behavior between people of the same relationships. Aspects can classify the relationship between participants of an online chat. A remote facility (for example a cloud-provided facility) provides a language model template applicable to the particular relationship type between the participants. The language model template, referred to herein as a relation-based template autocompletion model, may be particularized to the specific online chat involving the specific participants of that chat, by refining the model over time through training using collected messages that were sent as part of that online chat. Messages may be collected by the user device on which the user communicates as part of the online chat, and periodically or aperiodically fed back to the cloud facility to train and improve the language model used on that user's device. What initially begins as a template autocompletion model is thereby updated and refined into a relation-based autocompletion model that is specific to the subject user and the particular target recipients of those user-composed messages in the chat, insofar as word use, selection, tone, syntax, preference, and other properties of message composition.

Figure 1:
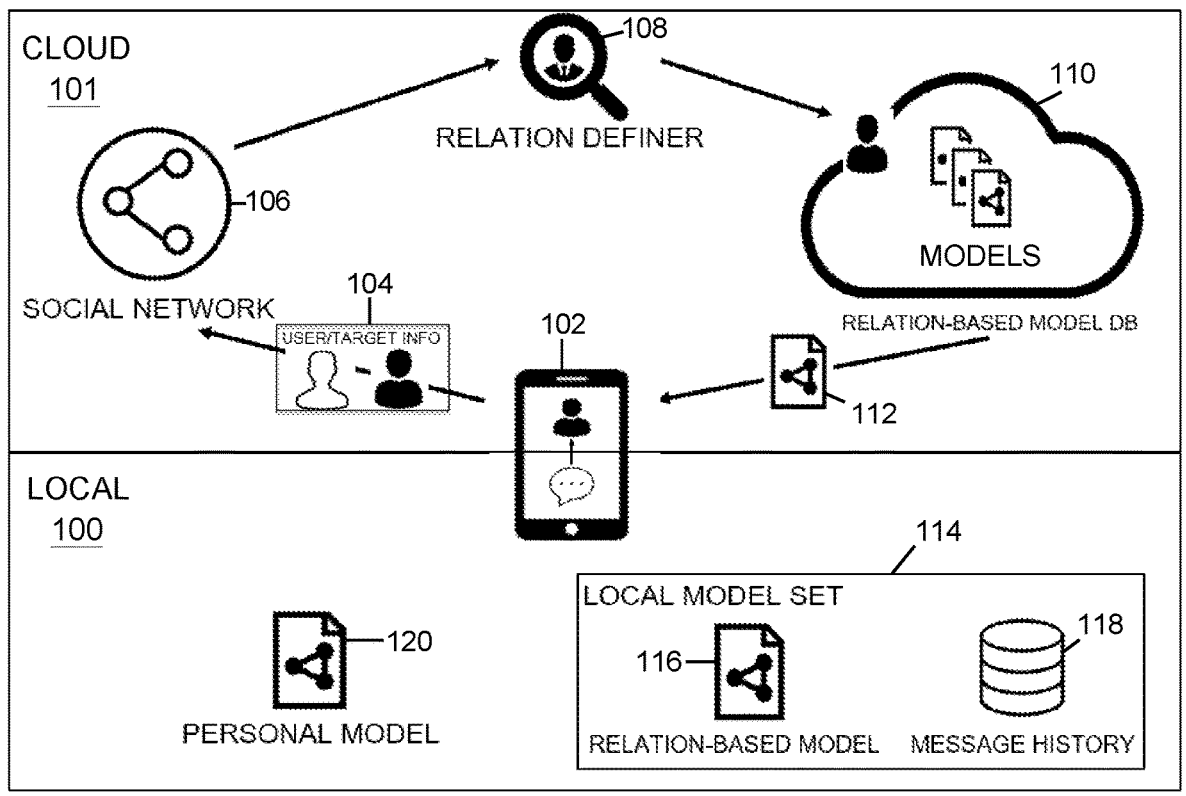
FIG. 1 depicts an example environment to incorporate and use aspects described herein.

FIG. 1 depicts an example environment to incorporate and use aspects described herein. The environment includes a local environment 100 (implemented primary by a user device 102) and a cloud environment 101. A user, represented by a user device, which in this example is a mobile device 102, begins a conversation (online chat) with a target participant in the chat. The user and target participant together form the participants to the chat in this example, though in other examples, as described further herein, there may be additional target participants that form a group chat of three or more participants.

The interface between the local and cloud environments is network connection(s) between the mobile device 102 and the cloud facility 101. Mobile device 102 initiates the conversation using mobile device chat software, for instance a text messaging application or other messaging app. The mobile device 102 sends participant information 104, for instance the name or other identifying information about the chat participants, to the cloud facility 101. The cloud facility defines/identifies a relationship between the participants, in this example leveraging social network information 106, by feeding the information into a relation definer component 108 to define the relationship. Any of various approaches can be taken by the relation refiner 108 to classify a relationship type between the user and the target participant. It may be as simple as identifying a social network relationship between the two from their social network profiles in the social network. For instance, the user might indicate in his social network profile that the target participant is the user's brother. In other examples, social network data (posts, likes, memberships, etc.) are analyzed to ascertain the relationship type. As another example, the cloud facility maintains or has access to cached information about the participants, for instance other online profile or directory information about the participants, contact information from the user's device, and/or other information, and this information is used to identify a relationship type as between the participants.

In any case, the cloud facility, based on the relationship type, targets a relation-based template autocompletion model database 110. The database houses at least one template model for each of various relationship types. Example relationship types include, but are not limited to: father/son, brother/brother, brother/sister, best friends, coworkers, employer/employee, employee/supervisor, and student/teacher. However, the relationship types may be of any granularity and possibly of various granularities. There may be several 'best friend' templates, for instance: one for 'two male best friends', one for 'female best friends, residence western United States', one for 'best friends from college', and so on.

Based on the identified relationship type, which may be identified using a function based, in part, on the depth of information available about the chat participants, the cloud facility selects one of the relation-based template auto-completion models (112) and provides it to the mobile device 102. As described herein, this model, initially a template, will be trained over time to become more tailored to the particular messaging behavior of the user when participating in the online chat, based on how the user communicates with the target participant. In addition, the target participant may also, on the target side, download an appropriate template model, which is refined over time based on how that target communicates to the user in the online chat. In this manner, each participant to an online chat may have a respect model that is refined over time based on how that participant participates in the online chat.

It is also noted that the scope of the 'online chat' need not necessarily exist as only a single chat session or even within the same software client. For instance, an online chat involving the same participants might encompass several disjoint sessions and/or threads, thus appearing as distinct conversations but nonetheless involving the same participants regardless of whether one session is a continuation of the previous. In one example, the participants chat during a first message session, then some time later resume the session, either in the same thread, as a new thread, or even in a different messaging application. These sessions may be regarded as one 'online chat', on the basis that the same set of participants is involved. Therefore, aspects described herein may apply to any communications that a given set of participants have, regardless of the timing or even the particular mediums (texting vs. instant messaging vs. email, for example) through which they communicate.

The template models, although being templates that become particularized to a specific user messaging in a specific online chat of a specific set of participants, nevertheless can be configured initially with some predictable characteristics of the particular type of relationships to which they apply. Even an 'untrained' template model can be configured to capture the nuances for a particular relationship type—for instance the template for an employee/boss relationship type may discourage or avoid the use of profane language when making autocompletion suggestions.

Although aspects discuss the training of a template model for a particular online chat involving particular participants to produce a relation-based autocompletion model, it is also noted that the template models in the database 110 can also evolve over time through training the templates themselves. For example, 'big data' in the form of collected messages/message data aggregated across many hundreds or thousands of user conversations can reflect common tendencies in the messages that participants having a particular relationship type send to each other, and these tendencies be used in training that tweaks the 'defaults' provided in the template models.

A relation-based autocompletion model is trained based on a particular online chat, which involves a particular set of participants. Thus, an appropriate template is pulled from the server whenever the user initiates a new online chat with another target participant, regardless of whether the relationship type matches that of another, existing online chat. The template 112 from the database will again be sent to the user device for use in the new online chat and particularized training of that template for that new online chat. By way of example, a user may have two brothers and initiate a chat with each of them. The template applicable to the relationship type 'brothers' may be pulled from the cloud for each chat, and therefore the model for each chat may initially be the same, i.e. the template model. The user may converse with the brothers differently in the respective chats, therefore, as the chats progress, the respective models may be trained separately, based on the chat to which the model applies.

The template is stored locally in a local model set 114, which model set 114 is specific to the particular target of the online chat. The model set 114 includes a relation-based autocompletion model 116 (which initially is the template from the cloud) together with a history of messages 118 for that online chat, i.e. messages that the user composed and sent to the target as part of the online chat. The message history 118 is used in training the relation-based autocompletion model 116 as described herein. For instance, the messages are uploaded to the cloud facility and, as is described in further detail below, the cloud facility trains a copy of the relation-based autocompletion model that it has using the messages. The cloud then pushes the now newly re-trained relation-based autocompletion model down to the mobile device 102, which replaces its prior model with the retrained model.

The personal autocompletion model 120 is not specific to any particular target participant or relationships. Instead, the personal autocompletion model 120 is a model of the type of language the user tends to use across all online chats. In other words, it models how the user communicates, in general, with individuals. In some examples, the personal model 120 is used as part of an ensemble to combine results of the modeling (using the personal and the relation-based models) depending on weights. At a high level, the ensemble can be considered the overarching model, which is based on the personal autocompletion model and the relation-based autocompletion model that was initially a template then trained over time.

Figure 2:
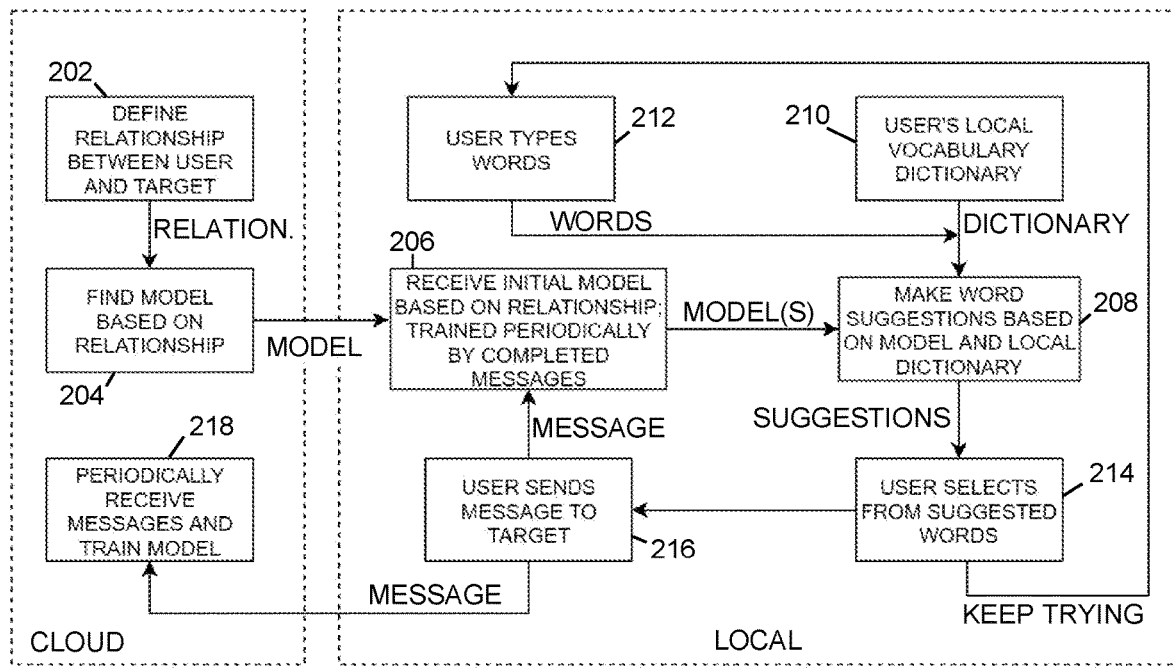
FIG. 2 depicts an example overall process for context-based autocompletion suggestion, in accordance with aspects described herein.

FIG. 2 depicts an example overall process for context-based autocompletion suggestion, in accordance with aspects described herein. Aspects are performed in part by cloud computer system(s) ("CLOUD") and in part by a user computer system ("LOCAL"), in this example. Aspects of FIG. 2 are also described with further reference to FIGS. 3-7.

Figure 3:
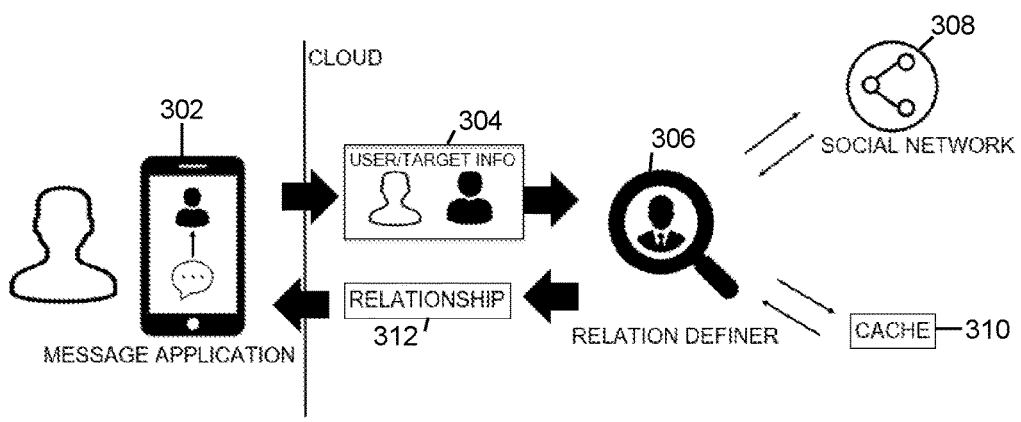
FIG. 3 depicts an example of relationship identification, in accordance with aspects described herein.

When a user starts a conversation with the target participant, the relationship between the two is identified/defined (202). FIG. 3 depicts an example of relationship identification, in accordance with aspects described herein. The local messaging application on the user device 302 sends the user and target's information 304 to the relationship definer 306 of the remote (e.g. cloud) facility to identify the relationship, e.g. it's type, as between the participants. The relation definer 306 leverages social network information 308 and/or cached information 310 in this example. For instance, the relationship definer 306 searches the cache and/or finds data on the social network to identify the relationship between the user and target. In the example of FIG. 3, an indication of the relationship type 312 is sent from the cloud to the user device 302.

Figure 4:
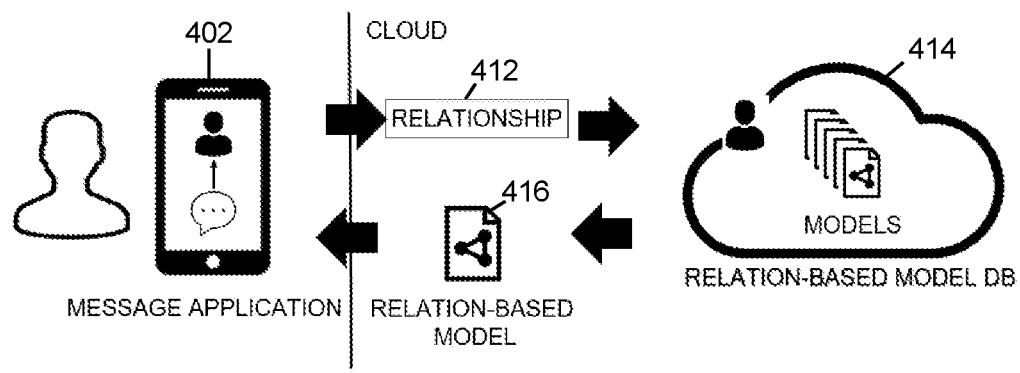
FIG. 4 depicts an example of relation-based template autocompletion model selection, in accordance with aspects described herein.

Returning the FIG. 2, the process identifies the relationship between the participants and then selects a template autocompletion model based on the relationship (204) and on searching a cloud database referred to as a relation-based template autocompletion model database. FIG. 4 depicts an example of relation-based template autocompletion model selection, in accordance with aspects described herein. The messaging application on the user device 402 provides an indication of the relationship 412 to the cloud facility, which searches the relation-based template autocompletion model database 414 to select the appropriate relation-based template autocompletion model 416, which is then provided and stored to a local cache of the user device 402 as the relation-based autocompletion model.

Referring back to FIG. 2, the template model is provided to the user device, which receives the initial (template) model that was selected based on the relationship between the user and target participant (206). The model 416 is initially the template provided from the cloud but is trained over time as described herein using completed (composed and sent) messages.

The process of FIG. 2 proceeds by using the relation-based autocompletion model and the local personal model to make word suggestions. This is done based on the user typing word(s) or word fragments (e.g. the first letter(s) of a desired word) (212). Words or word fragments are provided along with the user dictionary 210 and model(s) to make the word suggestions (208).

Figure 5:
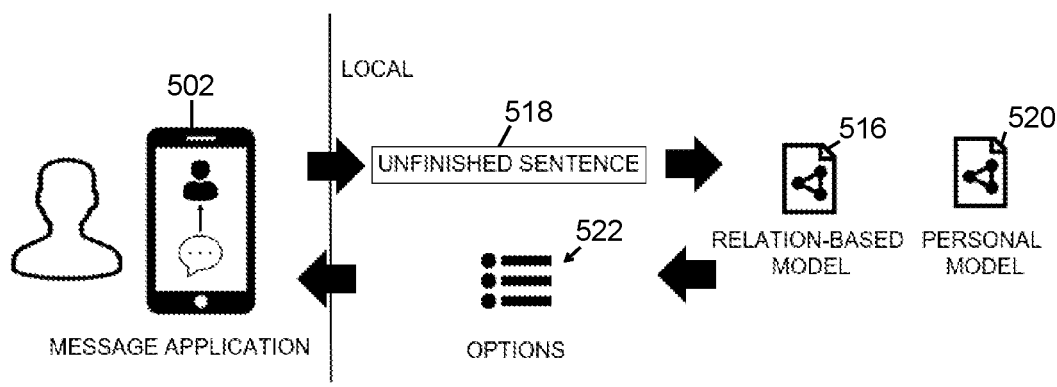
FIG. 5 depicts an example of word autocompletion suggestion, in accordance with aspects described herein.

FIG. 5 depicts an example of word autocompletion suggestion, in accordance with aspects described herein. In examples, this process is performed by the user's device. When the user starts typing words or word fragments, the messaging application feeds the input (e.g. as unfinished sentence 518) into the model, which in this case is an ensemble that includes the relation-based autocompletion model 516 and the personal autocompletion model 520. The model(s) produce a ranked list of suggestions 522, as suggested words for autocompletion, to the user device 502. The suggestions are, in some examples, a ranked list of words that are most strongly suggested by the models. It is noted that the suggestions may be complete word that the user has begun to type and/or suggestions for a next word in the message. For instance, the user may type "How ar", at which point the process suggests the word "are" to complete the word fragment "ar". Upon user selection of the word "are", so the message reads "How are", the process might then suggest the word "you" even though the user has not yet typed the character "y" to begin the word "you". In this manner, suggestions may consider phrases to be typed ("how are you"), and make suggestions based on the prior words that appear, rather than only on word fragments that have been typed.

The final results for suggestions from the ensemble model may be a weighted combination of the suggestions from the multiple models, as an example, though any of various approaches are available for using multiple models to arrive at a composite or overall set of suggestions. In a particular example, all results of models are gathered and the ensemble model normalizes the weightiness of each of the results, then selects the highest result. LSTM (Long short-term memory units) is a common model in training neural networks, and as applied in one example, is used in training the multiple models (e.g. a personal autocompletion model and relation-based autocompletion model) to predict the desired word and produce a result using a composite of the two models.

Referring back to FIG. 2, the suggestions are displayed for the user on the user device and the user may select from the suggested words (214). The user can select a suggested word or continue typing the desired word. In any case, assuming the user continues to compose the message by adding letters to a word or beginning to type the next word, the process proceeds back to (212).

Figure 6:
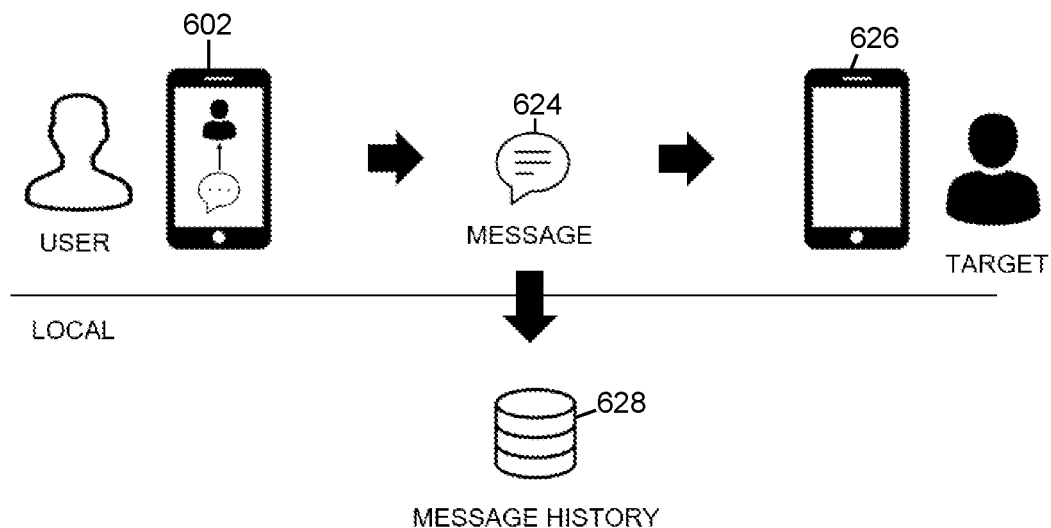
FIG. 6 depicts example message sending and saving, in accordance with aspects described herein.
Figure 7:
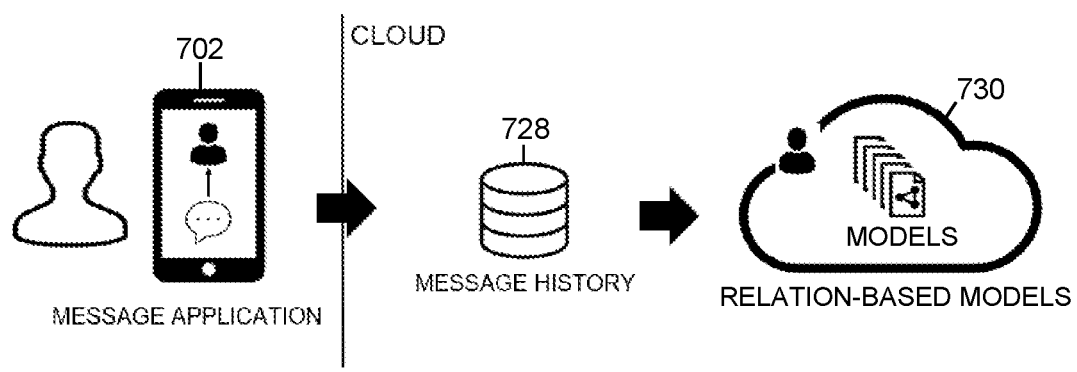
FIG. 7 depicts an example of relation-based autocompletion model retraining, in accordance with aspects described herein.

At some point, the user sends the message to the target participant (216). In addition to the message being transmitted to the target participant, the message is also saved as training data for training the relation-based model as described herein. Meanwhile, the process continues making word suggestions (208). FIG. 6 depicts example message sending and saving, in accordance with aspects described herein. The user device 602, when sending a message as part of the online chat, sends the message 624 to the target participant 626 and also saves the message in a local message history 628 at the user device. Periodically or aperiodically, sent messages of the chat that are also cached locally on the user device in the message history are sent to the cloud facility for further training the relation-based autocompletion model (218) specific to the participants to the online chat. FIG. 7 depicts an example of relation-based autocompletion model retraining, in accordance with aspects described herein. The local message history may be transferred to the cloud in batches, triggered by some event, for instance the local message history cache filling with entries and/or based on a number of cached messages or passage of an amount of time. Thus, in these examples, messages are not instantaneously transferred to the cloud when they are sent at part of the online chat, but instead are cached and batch-transferred from time to time by the client. In other examples, the messages are cached in the cloud rather than on the client device.

Referring to FIG. 7, after some predefined threshold amount of time or number of messages being cached, the message application of the user device 702 sends the message history 728 (that includes user-composed and sent message, and therefore reflects words that the user selected during autocompletion) to the cloud. The cloud facility has a relation-based models database 730 that includes a copy of the relation-based model that the user device has. The relation-based autocompletion model database 730 is not to be confused with the relation-based template autocompletion model database (#110 in FIG. 1), though they may be part of the same physical database or be different databases. The relation-based template autocompletion model database 110 houses the template models that serve as the initial relation-based autocompletion models for chat participants, while the relation-based autocompletion model database 730 houses the relation-based autocompletion models that are specific to a particular user who communicates to particular participants of a particular online chat and are trained based on user-sent messages sent as part of that chat. Since in these examples the cloud facility trains these relation-based autocompletion models on an ongoing basis as the user device provides the message history to the cloud, the cloud maintains a copy of the relation-based model.

The cloud facility trains and updates its copy of the relation-based model and provides the trained, updated relation-based autocompletion model back to the user device after training based on the updated message history is complete.

Figure 8:
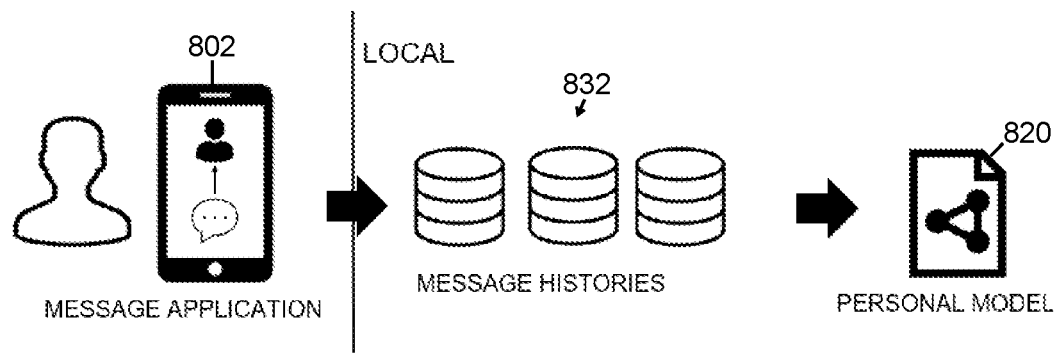
FIG. 8 depicts an example of personal autocompletion model retraining, in accordance with aspects described herein.

The personal autocompletion model at the user device can also be trained over time. FIG. 8 depicts an example of personal autocompletion model retraining, in accordance with aspects described herein. After a predefined threshold, for instance an amount of time or number of messages sent, the message application of the user device 802 will retrain the personal model using, as the training data, several message histories 832, which are the message histories of several online chats in which the user participates. This trains the personal model to provide a general representation of how the user communicates across many conversations.

Figure 9:
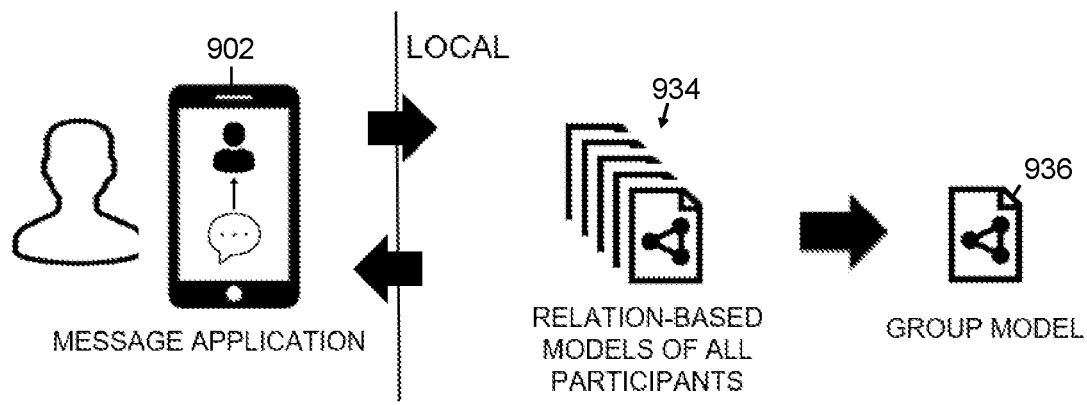
FIG. 9 depicts an example of group autocompletion model building, in accordance with aspects described herein.

Aspects described herein also apply to group online chats—that is, ones involving the user and two or more other participants, who are targets of the user's messages. In one example, a respective relation-based autocompletion model for each of the two or more other participants is obtained and combined to build a group autocompletion model. FIG. 9 depicts an example of group autocompletion model building, in accordance with aspects described herein. In the group chat context, the message application of the user device 802 obtains/downloads relation-based autocompletion models 934 for all other participants in the group chat. The models are weighted using any desired weights and composited into a group model 936, which may be uploaded and stored at the cloud facility, if desired.

In some examples, one or more of the obtained models used to build the group model are obtained as templates from the cloud, as described above. This may be the case particularly if the user has not previously communicated with a given target participant. However, optionally, if the user has an existing online chat with a particular target participant of the group chat, then the already-trained relation-based autocompletion model for the user's existing chat with the particular target participant may be used as the relation-based model for that participant to the group chat. By way of specific example, if the user begins a group chat with his parents and brother but the user device already has a trained relation-based autocompletion model used in a separate chat the user has with his brother, then that already-trained relation-based autocompletion model from the separate chat may be used in building the group model (along with whatever models are obtained for each of the user's parents). Alternatively, since a group chat context can change the dynamic that may otherwise exist between two people involved in their own separate one-on-one chat, in some embodiments the template from the cloud is pulled and used for a given participant in building the group model, instead of using any existing trained model that might already exist for that participant.

Figure 10:
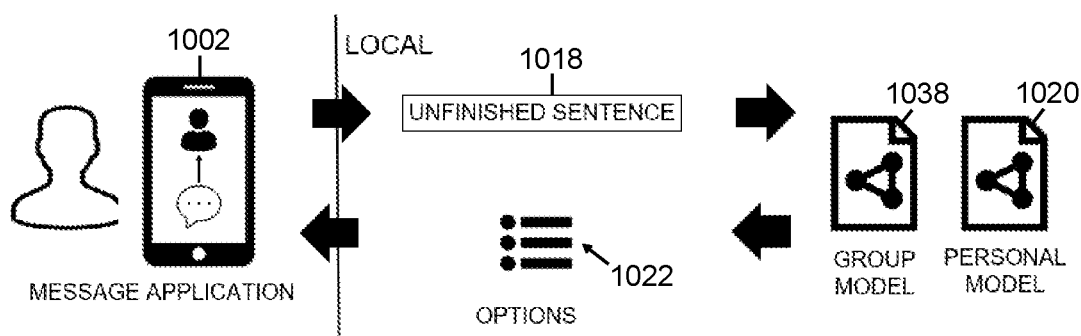
FIG. 10 depicts an example of word autocompletion suggestion for a group online chat, in accordance with aspects described herein.

The group autocompletion model may be used in conjunction with the personal autocompletion model for autocompletion suggestions when the user sends messages as part of an online group chat. FIG. 10 depicts an example of word autocompletion suggestion for a group online chat, in accordance with aspects described herein. Similar to the process in FIG. 5, as the user types an unfinished word/sentence 1018, this is fed by the message application of the user device 1002 into the model, which in this case is a local ensemble that includes the group model 1038 and the personal autocompletion model 1020. The model(s) produce a ranked list of suggestions 1022, as suggested words for autocompletion, to the user device 1002. The suggestions are, in some examples, a ranked list of words that are most strongly suggested by the models. In some examples, the system will provide suggestions based on a weighted average of the suggestions from the group model and the personal model.

Though in some examples the group model is not further trained, in other example it is further trained, either at the user device or at the cloud. For instance, a message history of messages sent by the user as part of the group chat are used to train the group model. In any case, messages sent as part of a group chat may, in some examples, not be used in the training of relation-based models for one-on-one online chats between the user and a target participant who happens to be a participant in the group chat as well. However, in other examples, the message sent in the group chat are used in the training of the individual relation-based models for each of the group chat participants, but the messages sent in the group chat may optionally weighted lower in terms of their influence on the model in the training than messages sent in the one-on-one chat with the target.

Accordingly, an intelligent cloud-assisted autocomplete facility is provided that takes user relationships with target participants into account when providing words/phrase suggestions. The facility uses a relationship-specific language model corresponding to the target, initially starting as a template model when the conversation first starts and being trained over time to tailor the autocompletion suggestions to the particular user's communication with the particular target participant. With a feedback mechanism, the system improves as more user conversation data are collected and sent back to cloud to retrain the language models.

Aspects described herein differ from approaches that utilize past chat history and supplemental features for text suggestion from a personalized dictionary on the device of the sender. For instance, some aspects described herein categorize a relationship between the subject user and target participant(s) and leverage initial template models that are relationship-specific. The template models may be updated and trained by the data from multiple communication channels involving the same relationship categories, for instance. In some aspects, the relationship is defined and an appropriate template model based on that relationship is used initially. That model is trained by the messages that the user types into that chat. A common database of template models maintained on the cloud greatly reduces the burden of storing raw and trained data on user devices. Additionally, text suggestion can be more accurate in comparison to maintaining and using only a personalized model, and a trained template-based approach provides improved initial accuracy at the inception of the conversation.

Figure 11:
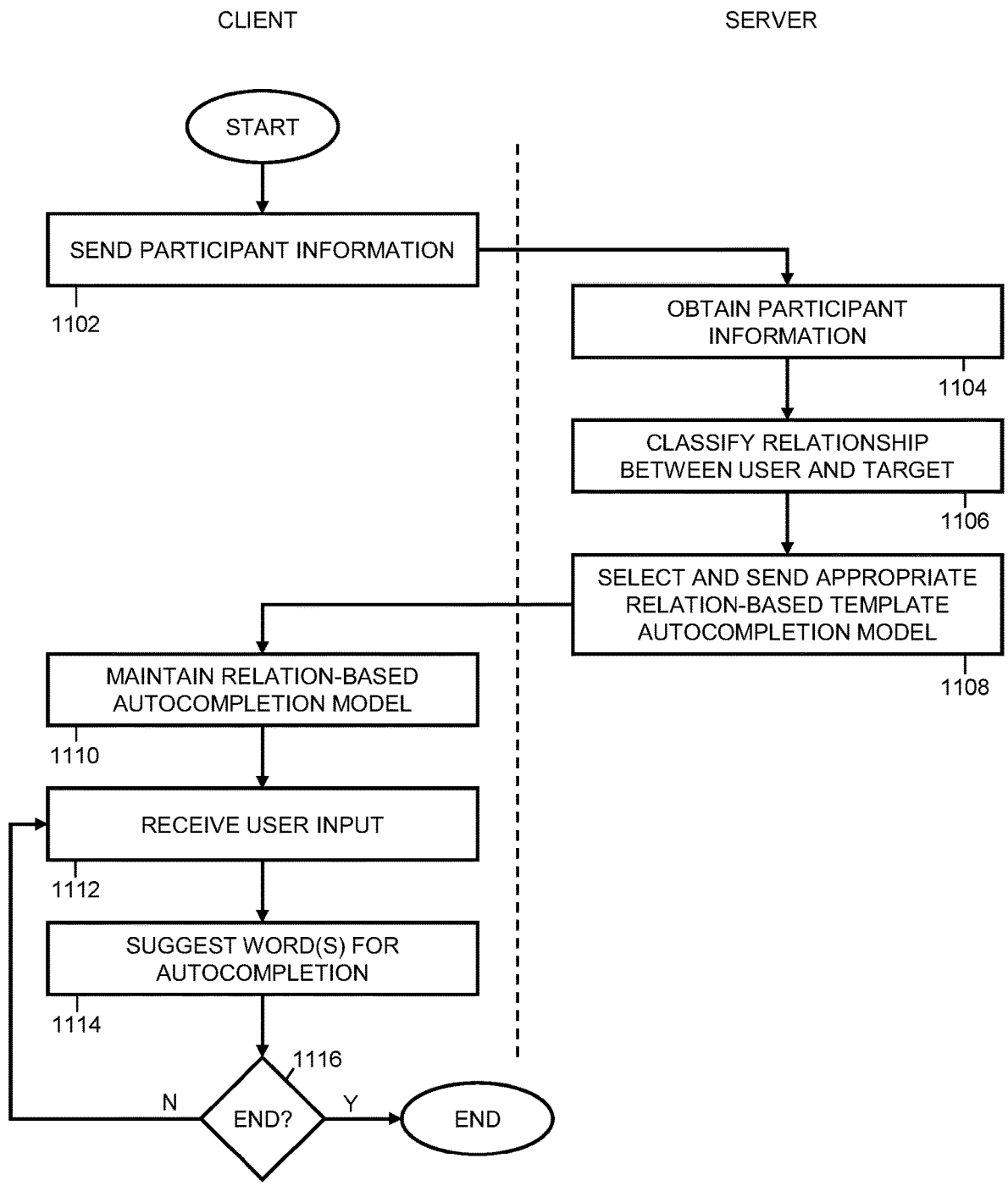
FIG. 11 depicts an example process for context-based autocompletion suggestion, in accordance with aspects described herein.

FIG. 11 depicts an example process for context-based autocompletion suggestion, in accordance with aspects described herein. Some aspects of FIG. 11 are performed on a client end (for instance a user device, referred to as the client in FIG. 11), while other aspects of FIG. 11 are performed on a server end (for instance at a cloud or other remote facility, referred to as the server in FIG. 11). Generally, aspects of the process of FIG. 11 are performed by computer system(s), such as those described herein, which may include one or more user devices, such as mobile devices, one or more cloud servers, and/or one or more other computer systems.

The process of FIG. 11 begins based on initiation of an online chat by a user of a computer system (e.g. a user device). The online chat has participants that include the user and a target participant to which messages sent by the user as part of the online chat are targeted. Based on the initiation of the online chat, the client provides to a remote facility (e.g. a cloud facility, the sever in FIG. 11) participant information of the participants of the online chat that identifies the participants of the online chat (1102). The participant information includes user and target participant information. The server obtains the participant information (1104), and a relationship identifier classifies a relationship type between the user and the target participant (1106). In some examples, the relationship identifier performed this classification using (i) cached information about the user and target participants and/or (ii) social network relationship between user and target participant. The server selects a relation-based template autocompletion model based on that relationship type from a plurality of different relation-based template autocompletion models corresponding to different relationship types. Example relationship types include sibling relationship types, friend relationship types, and/or coworker relationship types, though any types of relationship may be represented by the template models. The server selects and sends the selected relation-based autocompletion model to the computer system (1108).

The client maintains a relation-based autocompletion model for use in word autocompletion suggesting (1110). Initially, the maintained relation-based autocompletion model is the relation-based template autocompletion model that was received by the client from the server based on the client providing the participant information. Over time, this maintained relation-based autocompletion model is updated by training. An example process for maintaining a relation-based autocompletion model is depicted and described with reference to FIG. 12 below.

Continuing with the process of FIG. 11, the process receives user input (1112) in composing messages for sending as part of the chat. Based on the user input to compose messages for sending as part of the online chat, the process suggests to the user words for autocompletion in the user's composition of the messages (1114). The suggested words may be selected as suggestions based, at least in part, on the maintained relation-based autocompletion model.

The user input can include input of words and/or one or more letters of a word to be included in a composed message. Thus, the input could be a partially-entered word or could be already-input words. As part of the autocompletion suggesting, the partially-entered word or completed word(s) may be fed by a chat application through which the user participates in the online chat into the relation-based autocompletion model along with past typed or selected words from past messages with the target participant. Based on feeding this information into the model, the model may output a ranked list of word suggestions for the user (1114). The selected words may be selected as suggestions further based on a personal autocompletion model for the user that models the user's message composition habits across online chats. The autocompletion suggesting may therefore use an ensemble model, as a composite of the personal autocompletion model and the relation-based autocompletion model, where the ensemble selects the suggested words based on a weighting of suggestions obtained from the personal autocompletion model and from the relation-based autocompletion model. The suggestions produced from the relation-based autocompletion model may be weighted heavier than those from the personal autocompletion model, for instance. Additionally or alternatively, the selected words may be selected as suggestions further based on a user local vocabulary dictionary of common vocabulary used by the user in online chats.

In some aspects, the personal autocompletion models may be trained locally (by the client) based on locally-saved messages that are from multiple different one online chats in which the user participates, and which have different participants. In this manner, the personal model may model the user's communication behavior across online chats.

Continuing with FIG. 11, after word autocompletion suggestion, the user can select a suggested word or continue typing letters of the in-process word, or move onto a next word. In any case, the process determined whether it is to end (1116), for instance by the user sending a message or switching away from the chat program, as examples. If the process is not to end (1116, N), the process returns to 1112 to receive more user input and continue with autocompletion suggestion. Otherwise (1112, Y) the process ends.

Figure 12:
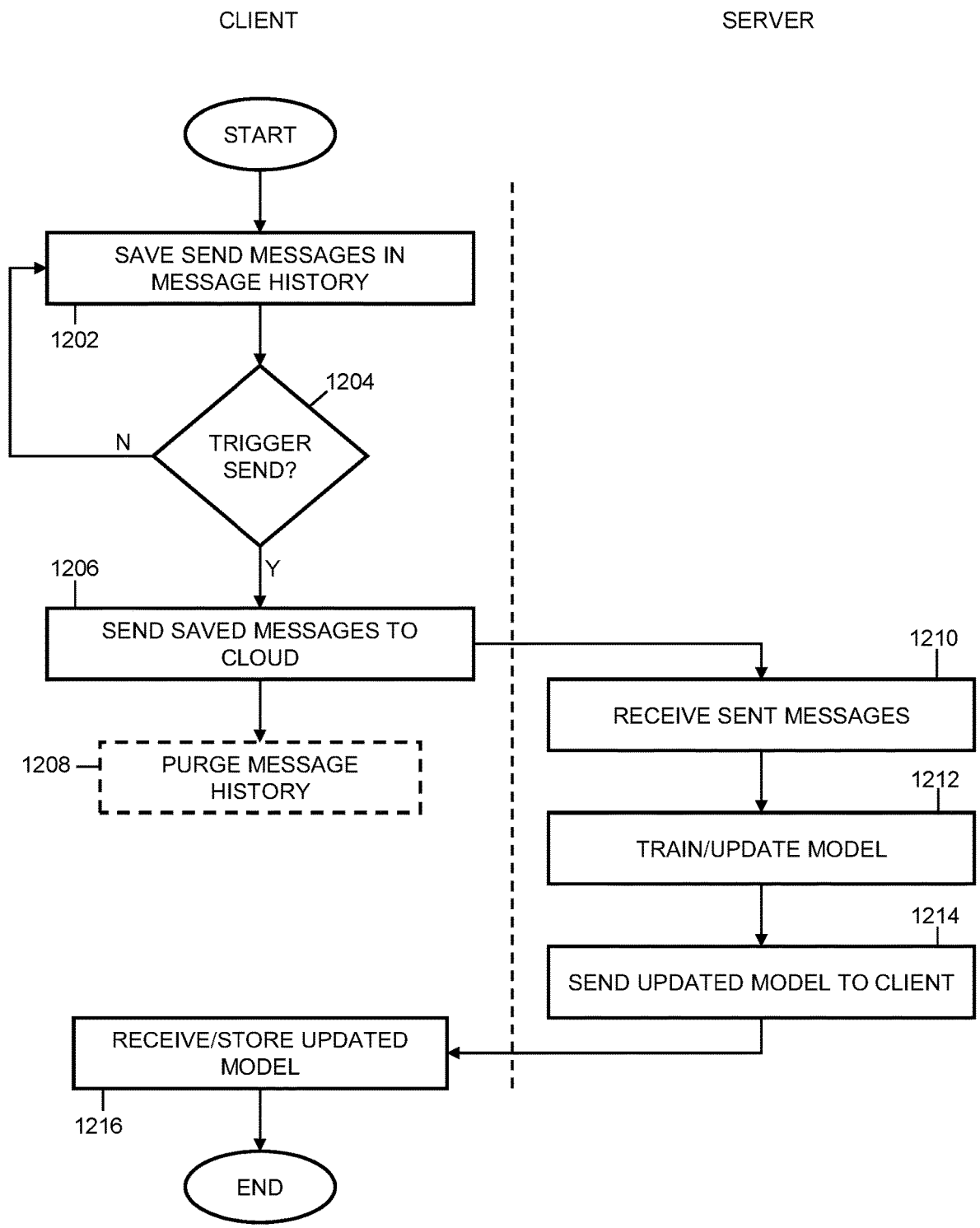
FIG. 12 depicts an example process for maintaining a relation-based autocompletion model, in accordance with aspects described herein.

FIG. 12 depicts an example process for maintaining a relation-based autocompletion model, in accordance with aspects described herein. Some aspects of FIG. 12 are performed on a client end (for instance a user device, referred to as the client in FIG. 12), while other aspects of FIG. 12 are performed on a server end (for instance at a cloud or other remote facility, referred to as the server in FIG. 12). Generally, aspects of the process of FIG. 12 are performed by computer system(s), such as those described herein, which may include one or more user devices, such as mobile devices, one or more cloud servers, and/or one or more other computer systems.

In some examples, the client maintains a target participant local model set that includes the maintained relation-based autocompletion model as well as a current set of locally saved messages to be used for further training of the maintained relation-based autocompletion model.

The process of FIG. 12 includes locally saving, on the client in a message history, sent messages composed and sent by the user as part of the online chat (1202). The process then determines whether to trigger the sending of the locally saved, sent messages of the message history, to the server for use in training the relation-based autocompletion model (1204). The sending may be triggered based on any desired criteria. For instance, the triggering may be based on (i) a threshold amount of time since the relation-based autocompletion model was trained and/or (ii) a number of locally saved, sent messages that have accumulated in the message history since last training. If it is determined not to trigger the sending of the locally saved messages (1204, N), the process returns to (1202) to save a next sent message, when/if sent. Otherwise (1204, Y) the process sends the locally saved, sent messages of the message history to the server for use in training the relation-based autocompletion model (1206). Optionally, the client can purge the message history if it is desired not to keep the messages any longer. Thus, based on sending the current set of locally saved message to the server, the process may discard the current set of locally saved messages from the client (1208). Subsequently composed and sent messages may then be saved as part of a next current set of locally saved messages for a next round of training the relation-based autocompletion model.

The server also has a current (i.e. the latest) relation-based autocompletion model, since the latest version is the most-recently trained version of the mode. The server receives the sent messages that were saved locally by the client and uploaded to the server (1210), and uses them to train the current relation-based autocompletion model and produce an updated relation-based autocompletion model (1212). The server then sends this updated model to the client (1214), and the client receives and stores that now trained and updated model (1216) as the maintained relation-based autocompletion model. The process returns to (1202) to save subsequent messages of the online chat for later training. Meanwhile, the updated model is now the maintained model (1110 of FIG. 11) for use in the suggesting (1114 of FIG. 11).

In some aspects, the server trains, over time, the template autocompletion models that it maintains. This training may be based on aggregated message history across many online chats that involve participants of the particular relationship type to which the template pertains. For instance, the 'siblings-brothers' template may be trained using messages sent between several different sets of brothers across several different chats. While each of those individual chats will have separate relation-based autocompletion models associated with them (e.g. one for each participant of a given chat) that are initially the template but are individually trained over time based on the messages of that chat, the aggregated message history across several chats between brothers may inform common vocabulary, phrases, syntax, and so on used in chats between brothers. The template 'siblings-brothers' model template is therefore refined and can be provided to users at the start of new chats between brothers.

Aspects described herein may be additionally used in the group online chat context. Based on initiation of a group online chat that has group participants that include the user and a plurality of target participants, a process on the user's client device can obtain a plurality of relation-based autocompletion models, including a respective relation-based autocompletion model for each target of the plurality of target participants. When an autocompletion model for a target participant of a group chat already exists on the client device, for instance that target participant of the group chat is a participant of a one-on-one chat with the user, and therefore a trained autocompletion model is already available, this already-available model may be used for that target participant. For other targets of the group chat, for which an autocompletion model is not already available on the client, the appropriate template model may be pulled from the cloud as described above, i.e. received in response to sending to the server group participant information of the group participants of the group chat. Alternatively, an appropriate template may be pulled for each target participant of the group chat regardless of whether a separate trained model for that participant already exists on the client.

The process on the user's device which obtains the plurality of relation-based autocompletion models for the group participant can continue by weighting the plurality of relation-based autocompletion models targets relative to each other and building a group autocompletion model based on the weighted plurality of relation-based autocompletion models. Then, based on user input to compose messages for sending as part of the group online chat, the process can suggest to the user words for autocompletion in the user's composition of the messages for sending as part of the group online chat. The suggested words for the messages for sending as part of the group online chat can be selected as suggestions based, at least in part, on the group autocompletion model and the personal autocompletion model for the user that models the user's message composition habits across online chats.

Although various examples are provided, variations are possible without departing from a spirit of the claimed aspects.

Figure 13:
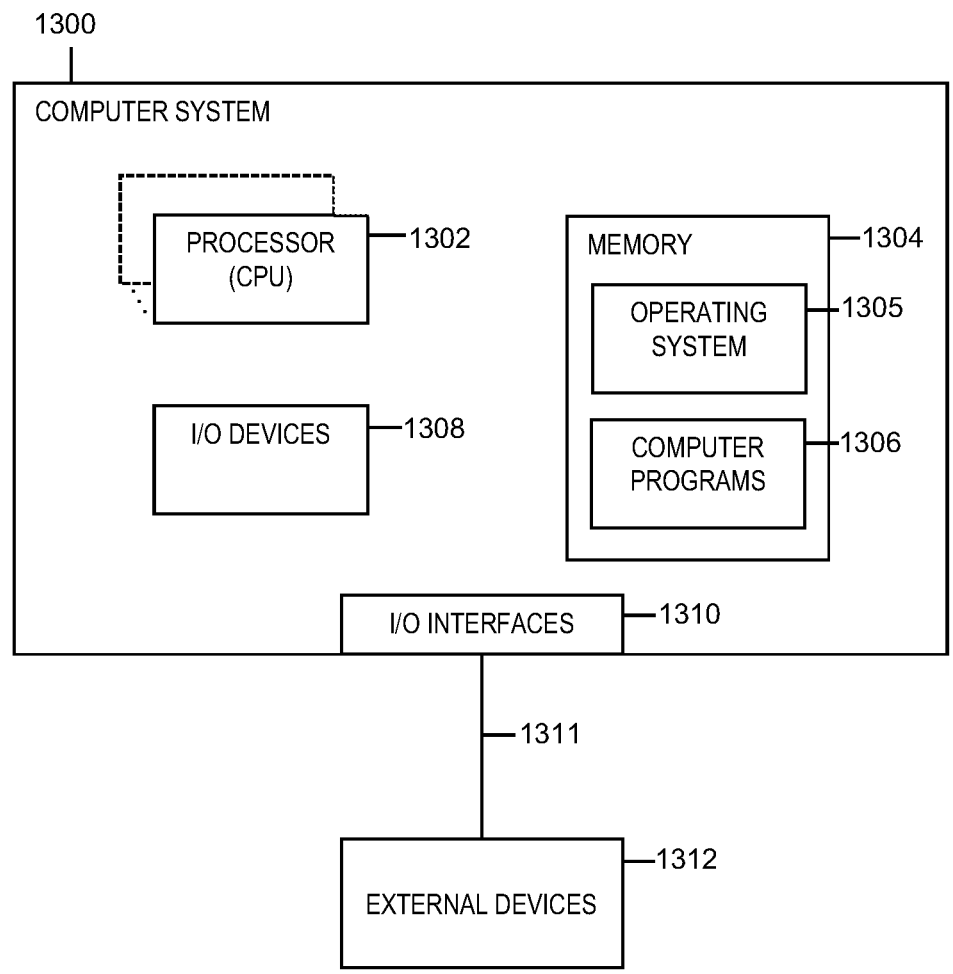
FIG. 13 depicts one example of a computer system and associated devices to incorporate and/or use aspects described herein.

Processes described herein may be performed singly or collectively by one or more computer systems, such as one or more cloud-based servers, client computing devices, or a combination of the foregoing, as examples. FIG. 13 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 13 shows a computer system 1300 in communication with external device(s) 1312. Computer system 1300 includes one or more processor(s) 1302, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 1302 can also include register(s) to be used by one or more of the functional components. Computer system 1300 also includes memory 1304, input/output (I/O) devices 1308, and I/O interfaces 1310, which may be coupled to processor(s) 1302 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 1304 can be or include main or system memory (e.g. Random Access Memory) used in the execution of program instructions, storage device(s) such as hard drive(s), flash media, or optical media as examples, and/or cache memory, as examples. Memory 1304 can include, for instance, a cache, such as a shared cache, which may be coupled to local caches (examples include L1 cache, L2 cache, etc.) of processor(s) 1302. Additionally, memory 1304 may be or include at least one computer program product having a set (e.g., at least one) of program modules, instructions, code or the like that is/are configured to carry out functions of embodiments described herein when executed by one or more processors.

Memory 1304 can store an operating system 1305 and other computer programs 1306, such as one or more computer programs/applications that execute to perform aspects described herein. Specifically, programs/applications can include computer readable program instructions that may be configured to carry out functions of embodiments of aspects described herein.

Examples of I/O devices 1308 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (1312) coupled to the computer system through one or more I/O interfaces 1310.

Computer system 1300 may communicate with one or more external devices 1312 via one or more I/O interfaces 1310. Example external devices include a keyboard, a pointing device, a display, and/or any other devices that enable a user to interact with computer system 1300. Other example external devices include any device that enables computer system 1300 to communicate with one or more other computing systems or peripheral devices such as a printer. A network interface/adapter is an example I/O interface that enables computer system 1300 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 1310 and external devices 1312 can occur across wired and/or wireless communications link(s) 1311, such as Ethernet-based wired or wireless connections. Example wireless connections include cellular, Wi-Fi, Bluetooth®, proximity-based, near-field, or other types of wireless connections. More generally, communications link(s) 1311 may be any appropriate wireless and/or wired communication link(s) for communicating data.

Particular external device(s) 1312 may include one or more data storage devices, which may store one or more programs, one or more computer readable program instructions, and/or data, etc. Computer system 1300 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 1300 may be operational with numerous other general purpose or special purpose computing system environments or configurations. Computer system 1300 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
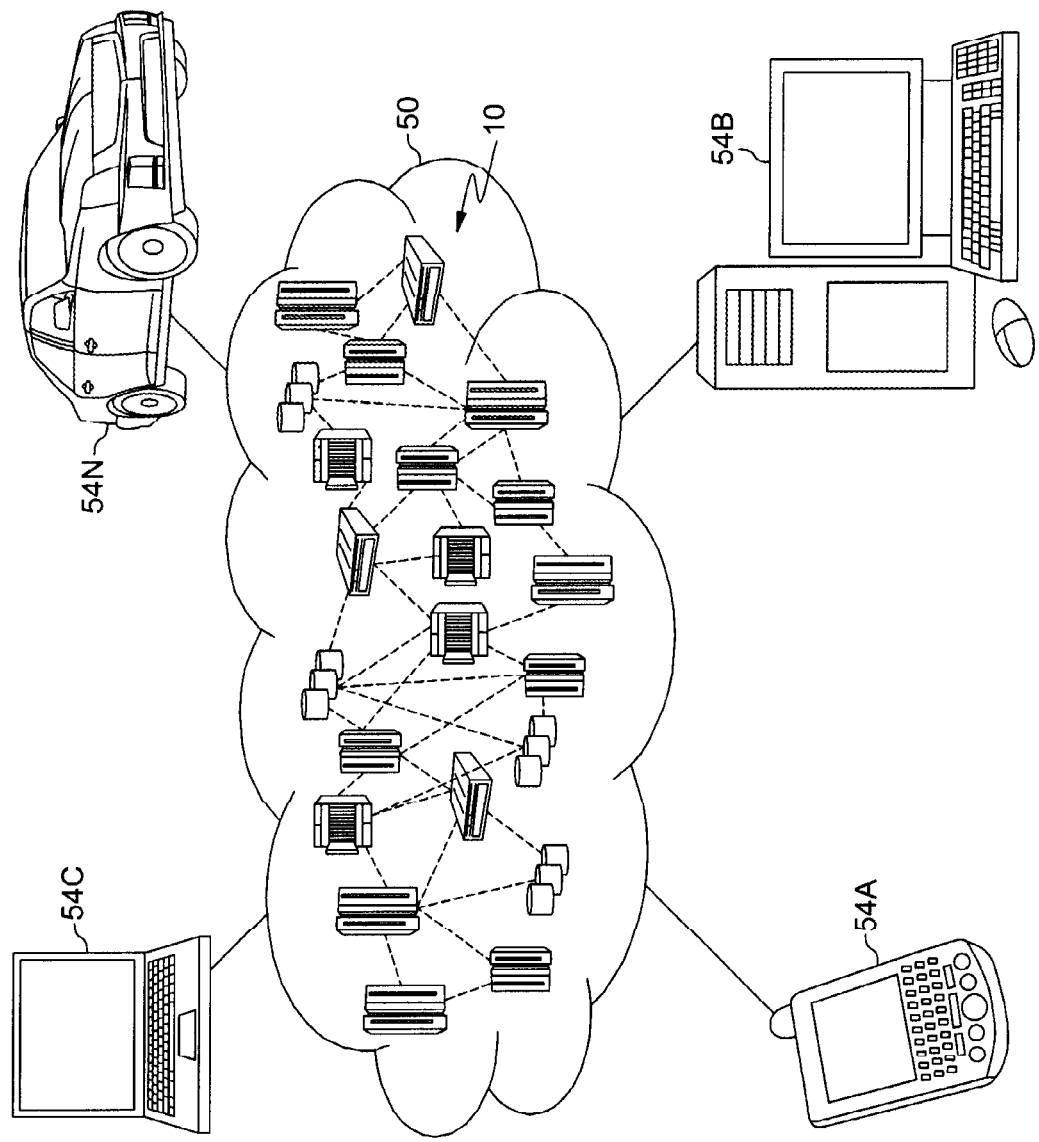
FIG. 14 depicts a cloud computing environment according to an embodiment described herein.

Referring now to FIG. 14, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 14 are intended to be illustrative only and that computing nodes 10 and cloud computing environment 50 can communicate with any type of computerized device over any type of network and/or network addressable connection (e.g., using a web browser).

Figure 15:
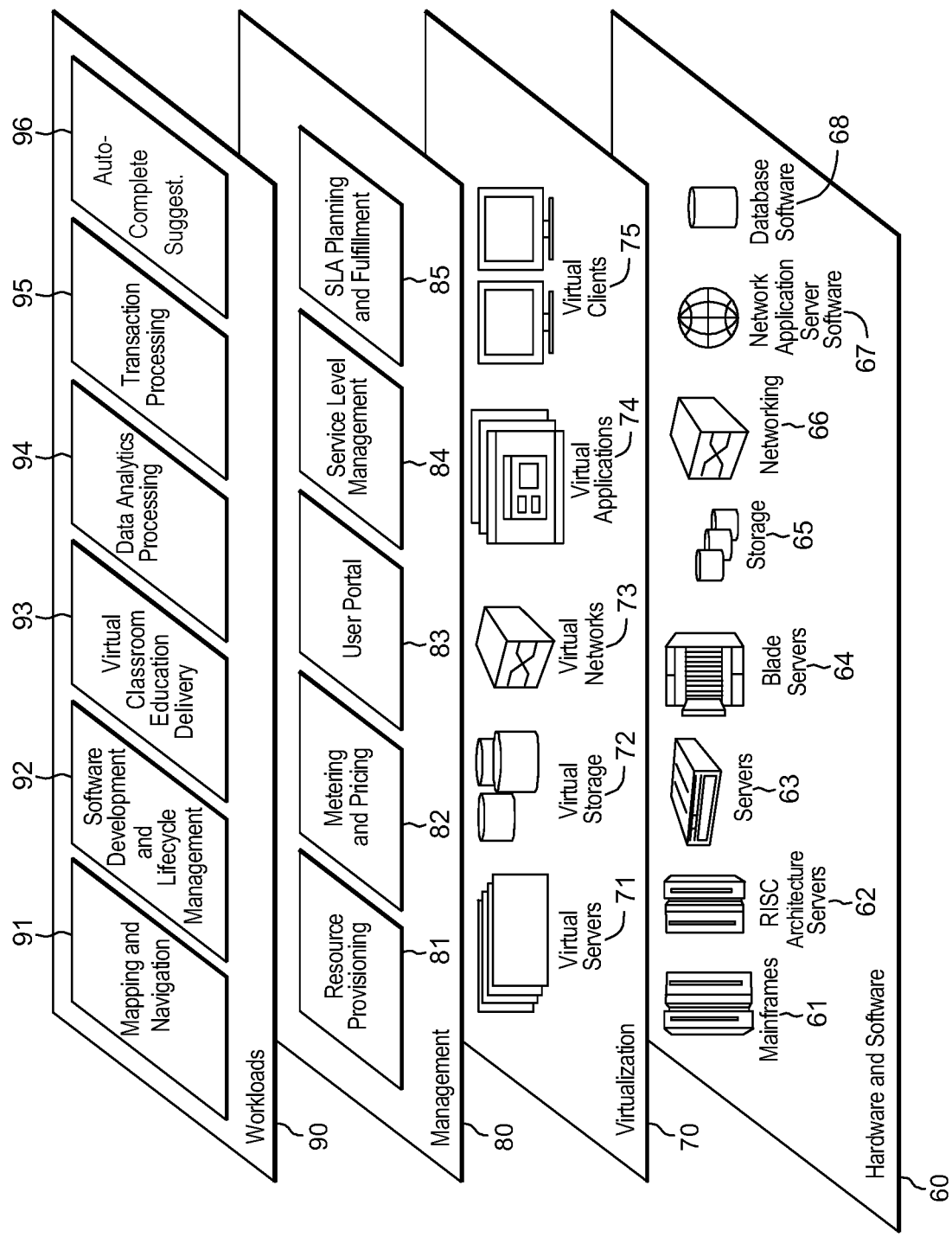
FIG. 15 depicts abstraction model layers according to an embodiment described herein.

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and context-based word auto-completion suggestion 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:

based on initiation of an online chat by a user of a computer system, the online chat having participants that include the user and a target participant to which messages sent by the user as part of the online chat are targeted, providing to a remote facility participant information of the participants of the online chat that identifies the participants of the online chat, wherein a relationship between the user and the target participant is classified into a particular relationship type;

maintaining at the computer system a relation-based autocompletion model for use in word autocompletion suggesting, wherein the maintained relation-based autocompletion model is initially a relation-based template autocompletion model received by the computer system from the remote facility based on providing the participant information, wherein the remote facility maintains a plurality of different relation-based template autocompletion models each corresponding to a respective different relationship type of a plurality of different relationship types, wherein the relation-based template autocompletion model is selected from the plurality of different relation-based template autocompletion models for provision to the computer system for use in word autocompletion suggesting for the online chat, wherein the selection of that relation-based template autocompletion model from the plurality of different relation-based template autocompletion models is made by selecting the relation-based template autocompletion model, of the plurality of different relation-based template autocompletion models, that corresponds to the classified particular relationship type between the user and the target participant, wherein the selected relation-based template autocompletion model is initially trained using conversations between participants, having the particular relationship type therebetween, that include neither the user nor the target participant, and wherein the relation-based autocompletion model is updated over time by training the relation-based autocompletion model; and based on user input to compose messages for sending as part of the online chat, suggesting to the user words for autocompletion in the user's composition of the messages, the suggested words being selected as suggestions based, at least in part, on the maintained relation-based autocompletion model;

wherein the maintaining the relation-based autocompletion model comprises:

locally saving, on the computer system in a message history, sent messages composed and sent by the user as part of the online chat;

sending the locally saved, sent messages of the message history to the remote facility for use in training the relation-based autocompletion model;

receiving from the remote facility, based on the training, a trained, updated relation-based autocompletion model; and storing the received, trained, updated relation-based autocompletion model on the computer system as the maintained relation-based autocompletion model for use in the suggesting.

2. The method of claim 1, wherein the computer system maintains a target participant local model set that includes the maintained relation-based autocompletion model and a current set of locally saved messages to be used for further training of the maintained relation-based autocompletion model, wherein based on sending the current set of locally saved messages to the remote facility, the method discards the current set of locally saved messages from the computer system, and saves subsequently composed and sent messages as part of a next current set of locally saved messages for a next round of training the relation-based autocompletion model.

3. The method of claim 1, wherein the user input comprises a partially-entered word, and wherein the method further comprises feeding, by a chat application, of the computer system, through which the user participates in the online chat, the partially-entered word and past typed or selected words from past messages with the target participant into the relation-based autocompletion model, wherein based on the feeding, the relation-based autocompletion model outputs a ranked list of word suggestions for the user.

4. The method of claim 1, wherein the selected words are selected as suggestions further based on a personal autocompletion model for the user that models the user's message composition habits across online chats.

5. The method of claim 4, further comprising training the personal autocompletion model based on locally saved messages from a plurality of online chats in which the user participates and which have differing participants.

6. The method of claim 4, wherein the suggesting uses an ensemble model as a composite of the personal autocompletion model and the relation-based autocompletion model, wherein the ensemble selects the suggested words based on a weighting of suggestions from the personal autocompletion mode and from the relation-based autocompletion model.

7. The method of claim 4, wherein the selected words are selected as suggestions further based on a user local vocabulary dictionary of common vocabulary used by the user in online chats.

8. The method of claim 1, wherein the sending is triggered based on at least one selected from the group consisting of: (i) a threshold amount of time since the relation-based autocompletion model was trained, and (ii) a number of locally saved, sent messages in the message history.

9. The method of claim 1, wherein based on the providing the participant information of the participants of the online chat:

a relationship identifier classifies the relationship type between the user and the target participant using at least one selected from the group consisting of: (i) cached information about the user and target participants, and (ii) social network relationship between user and target participant;

the relation-based template autocompletion model is selected from the plurality of different relation-based template autocompletion models corresponding to different relationship types; and the computer system obtains the selected relation-based autocompletion model.

10. The method of claim 1, further comprising, based on initiation of a group online chat having group participants that include the user and a plurality of target participants:

obtaining a plurality of relation-based autocompletion models, comprising a respective relation-based autocompletion model for each target of the plurality of target participants, at least some of the plurality of relation-based autocompletion models being obtained as relation-based template autocompletion models received in response to sending to the remote facility group participant information of the group participants of the group online chat;

weighting the plurality of relation-based autocompletion models relative to each other and building a group autocompletion model based on the weighted plurality of relation-based autocompletion models; and based on user input to compose messages for sending as part of the group online chat, suggesting to the user words for autocompletion in the user's composition of the messages for sending as part of the group online chat, the suggested words for the messages for sending as part of the group online chat being selected as suggestions based, at least in part, on the group autocompletion model and a personal autocompletion model for the user that models the user's message composition habits across online chats.

11. A computer system comprising:
a memory; and
a processor in communication with the memory, wherein the computer system is configured to perform a method comprising:
based on initiation of an online chat by a user of a computer system, the online chat having participants that include the user and a target participant to which messages sent by the user as part of the online chat are targeted, providing to a remote facility participant information of the participants of the online chat that identifies the participants of the online chat, wherein a relationship between the user and the target participant is classified into a particular relationship type;
maintaining at the computer system a relation-based autocompletion model for use in word autocompletion suggesting, wherein the maintained relation-based autocompletion model is initially a relation-based template autocompletion model received by the computer system from the remote facility based on providing the participant information, wherein the remote facility maintains a plurality of different relation-based template autocompletion models each corresponding to a respective different relationship type of a plurality of different relationship types, wherein the relation-based template autocompletion model is selected from the plurality of different relation-based template autocompletion models for provision to the computer system for use in word autocompletion suggesting for the online chat, wherein the selection of that relation-based template autocompletion model from the plurality of different relation-based template autocompletion models is made by selecting the relation-based template autocompletion model, of the plurality of different relation-based template autocompletion models, that corresponds to the classified particular relationship type between the user and the target participant, wherein the selected relation-based template autocompletion model is initally trained using conversation between participants, having the particular relationship type therebetween, that include neither the user nor the target participant, and wherein the relation-based autocompletion model is updated over time by training the relation-based autocompletion model; and
based on user input to compose messages for sending as part of the online chat, suggesting to the user words for autocompletion in the user's composition of the messages, the suggested words being selected as suggestions based, at least in part, on the maintained relation-based autocompletion model;
wherein the maintaining the relation-based autocompletion model comprises:
locally saving, on the computer system in a message history, sent messages composed and sent by the user as part of the online chat;
sending the locally saved, sent messages of the message history to the remote facility for use in training the relation-based autocompletion model;
receiving from the remote facility, based on the training, a trained, updated relation-based autocompletion model; and
storing the received, trained, updated relation-based autocompletion model on the computer system as the maintained relation-based autocompletion model for use in the suggesting.

12. The computer system of claim 11, wherein the user input comprises a partially-entered word, and wherein the method further comprises feeding, by a chat application, of the computer system, through which the user participates in the online chat, the partially-entered word and past typed or selected words from past messages with the target participant into the relation-based autocompletion model, wherein based on the feeding, the relation-based autocompletion model outputs a ranked list of word suggestions for the user.

13. The computer system of claim 11, wherein the selected words are selected as suggestions further based on a personal autocompletion model for the user that models the user's message composition habits across online chats.

14. The computer system of claim 13, wherein the method further comprises training the personal autocompletion model based on locally saved messages from a plurality of online chats in which the user participates and which have differing participants.

15. The computer system of claim 13, wherein the selected words are selected as suggestions further based on a user local vocabulary dictionary of common vocabulary used by the user in online chats.

16. The computer system of claim 11, wherein based on the providing the participant information of the participants of the online chat:
a relationship identifier classifies the relationship type between the user and the target participant using at least one selected from the group consisting of: (i) cached information about the user and target participants, and (ii) social network relationship between user and target participant;
the relation-based template autocompletion model is selected from the plurality of different relation-based template autocompletion models corresponding to different relationship types; and
the computer system obtains the selected relation-based autocompletion model.

17. The computer system of claim 11, wherein the method further comprises, based on initiation of a group online chat having group participants that include the user and a plurality of target participants:
obtaining a plurality of relation-based autocompletion models, comprising a respective relation-based autocompletion model for each target of the plurality of target participants, at least some of the plurality of relation-based autocompletion models being obtained as relation-based template autocompletion models received in response to sending to the remote facility group participant information of the group participants of the group online chat;
weighting the plurality of relation-based autocompletion models relative to each other and building a group autocompletion model based on the weighted plurality of relation-based autocompletion models; and based on user input to compose messages for sending as part of the group online chat, suggesting to the user words for autocompletion in the user's composition of the messages for sending as part of the group online chat, the suggested words for the messages for sending as part of the group online chat being selected as suggestions based, at least in part, on the group autocompletion model and a personal autocompletion model for the user that models the user's message composition habits across online chats.

18. A computer program product comprising:

a computer readable storage medium readable by a processing circuit and storing instructions for execution by the processing circuit for performing a method comprising:

based on initiation of an online chat by a user of a computer system, the online chat having participants that include the user and a target participant to which messages sent by the user as part of the online chat are targeted, providing to a remote facility participant information of the participants of the online chat that identifies the participants of the online chat, wherein a relationship between the user and the target participant is classified into a particular relationship type;

maintaining at the computer system a relation-based autocompletion model for use in word autocompletion suggesting, wherein the maintained relation-based autocompletion model is initially a relation-based template autocompletion model received by the computer system from the remote facility based on providing the participant information, wherein the remote facility maintains a plurality of different relation-based template autocompletion models each corresponding to a respective different relationship type of a plurality of different relationship types, wherein the relation-based template autocompletion model is selected from the plurality of different relation-based template autocompletion models for provision to the computer system for use in word autocompletion suggesting for the online chat, wherein the selection of that relation-based template autocompletion model from the plurality of different relation-based template autocompletion models is made by selecting the relation-based template autocompletion model, of the plurality of different relation-based template autocompletion models, that corresponds to the classified particular relationship type between the user and the target participant, wherein the selected relation-based template autocompletion model is initially trained using conversations between participants, having the particular relationship type therebetween, the include neither the user nor the target particular, and wherein the relation-based autocompletion model is updated over time by training the relation-based autocompletion model; and based on user input to compose messages for sending as part of the online chat, suggesting to the user words for autocompletion in the user's composition of the messages, the suggested words being selected as suggestions based, at least in part, on the maintained relation-based autocompletion model;

wherein the maintaining the relation-based autocompletion model comprises:

locally saving, on the computer system in a message history, sent messages composed and sent by the user as part of the online chat;

sending the locally saved, sent messages of the message history to the remote facility for use in training the relation-based autocompletion model;

receiving from the remote facility, based on the training, a trained, updated relation-based autocompletion model; and storing the received, trained, updated relation-based autocompletion model on the computer system as the maintained relation-based autocompletion model for use in the suggesting.

19. The computer program product of claim 18, wherein the selected words are selected as suggestions further based on a personal autocompletion model for the user that models the user's message composition habits across online chats, and on a user local vocabulary dictionary of common vocabulary used by the user in online chats, wherein the method further comprises training the personal autocompletion model based on locally saved messages from a plurality of online chats in which the user participates and which have differing participants.

20. The computer program product of claim 18, wherein the method further comprises, based on initiation of a group online chat having group participants that include the user and a plurality of target participants:

obtaining a plurality of relation-based autocompletion models, comprising a respective relation-based autocompletion model for each target of the plurality of target participants, at least some of the plurality of relation-based autocompletion models being obtained as relation-based template autocompletion models received in response to sending to the remote facility group participant information of the group participants of the group online chat;

weighting the plurality of relation-based autocompletion models relative to each other and building a group autocompletion model based on the weighted plurality of relation-based autocompletion models; and based on user input to compose messages for sending as part of the group online chat, suggesting to the user words for autocompletion in the user's composition of the messages for sending as part of the group online chat, the suggested words for the messages for sending as part of the group online chat being selected as suggestions based, at least in part, on the group autocompletion model and a personal autocompletion model for the user that models the user's message composition habits across online chats.

\* \* \* \* \*